United States Patent
Xu et al.

(10) Patent No.: US 11,648,721 B2
(45) Date of Patent: May 16, 2023

(54) CO-ROTATING DUAL SPEED MULTI-SCREW EXTRUDER AND PROCESSING METHOD THEREOF

(71) Applicant: WUYI UNIVERSITY, Jiangmen (CN)

(72) Inventors: Baiping Xu, Jiangmen (CN); Huiwen Yu, Jiangmen (CN); Yaoxue Du, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 694 days.

(21) Appl. No.: 16/530,860

(22) Filed: Aug. 2, 2019

(65) Prior Publication Data
US 2020/0338802 A1 Oct. 29, 2020

(30) Foreign Application Priority Data

Apr. 28, 2019 (CN) .......................... 201910349687.2

(51) Int. Cl.
| | | |
|---|---|---|
| *B29C 48/405* | (2019.01) | |
| *B29C 48/425* | (2019.01) | |
| *B29C 48/59* | (2019.01) | |
| *B29C 48/25* | (2019.01) | |

(52) U.S. Cl.
CPC ........ *B29C 48/405* (2019.02); *B29C 48/2517* (2019.02); *B29C 48/425* (2019.02); *B29C 48/59* (2019.02)

(58) Field of Classification Search
CPC ..... B29C 48/405; B29C 48/423; B29C 48/59; B29C 48/2517; B29C 48/42; B29C 48/65; B01F 27/703; B01F 27/706; B01F 27/708
(Continued)

(56) References Cited

U.S. PATENT DOCUMENTS

2013/0089634 A1* 4/2013 Xu .................. B29C 48/405
425/226
2017/0296989 A1* 10/2017 Xu .................. B29B 7/489

FOREIGN PATENT DOCUMENTS

| CN | 201752925 | 3/2011 |
|---|---|---|
| CN | 103057089 | 4/2013 |

(Continued)

OTHER PUBLICATIONS

First Chinese Office Action issued in 201910349687.2 dated Sep. 3, 2020, and English Translation thereof.
(Continued)

*Primary Examiner* — Marc C Howell
(74) *Attorney, Agent, or Firm* — Arc IP Law, PC; Joseph J. Mayo

(57) ABSTRACT

The disclosure discloses a co-rotating dual speed multi-screw extruder and a processing method thereof, the co-rotating dual speed multi-screw extruder enables a first screw and a second screw with the same outer diameter to co-rotate at different speed in a barrel, and the two screws wipe with each other, to achieve self-cleaning in processing; and circular arcs meshed with each other are respectively arranged between root diameters and top diameters of the two screws to form a first step structure and a second step structure, thus breaking an axial symmetry of a cross-sectional contour of the screws, and moreover, the first step structure and the second step structure are periodically meshed in a meshing zone in a staggered manner, so that a flow channel in the meshing zone is changed in a topological way, a strong elongation action and a strong disturbance action are effectively introduced in the meshing zone.

8 Claims, 4 Drawing Sheets

(58) Field of Classification Search
USPC .............................................. 366/83
See application file for complete search history.

(56) References Cited

FOREIGN PATENT DOCUMENTS

| CN | 106476242 | | 3/2017 | |
| --- | --- | --- | --- | --- |
| CN | 106476242 A | * | 3/2017 | ........... B29C 48/402 |
| CN | 107031015 | | 8/2017 | |
| CN | 107139425 | | 9/2017 | |
| CN | 206840670 | | 1/2018 | |
| CN | 206967925 | | 2/2018 | |
| EP | 0343326 | | 3/1989 | |
| WO | 2019070797 | | 4/2019 | |

OTHER PUBLICATIONS

First Search Report issued in 201910349687.2, dated Aug. 28, 2020, and English Translation thereof.

International Preliminary Report on Patentability issued in PCT/CN2019/086329, dated Jan. 15, 2020, and English Translation thereof.

International Preliminary Report on Patentability issued in PCT/CN2019/098961, dated Jan. 21, 2020, and English Translation thereof.

International Search Report issued in PCT/CN2019/086329, dated Jan. 15, 2020, and English Translation thereof.

International Search Report issued in PCT/CN2019/098961, dated Jan. 21, 2020, and English Translation thereof.

Written Opinion of the International Searching Authority issued in PCT/CN2019/086329, dated Jan. 15, 2020, and English Translation thereof.

Written Opinion of the International Searching Authority issued in PCT/CN2019/098961, dated Jan. 21, 2020, and English Translation thereof.

* cited by examiner

CO-ROTATING DUAL SPEED MULTI-SCREW EXTRUDER AND PROCESSING METHOD THEREOF

BACKGROUND OF THE INVENTION

Field of the Invention

The present disclosure relates to the field of multi-screw extruder, and more particularly, to a co-rotating dual speed multi-screw extruder and a processing method thereof.

Description of the Related Art

A co-rotating multi-screw extruder mainly comprises a barrel and a plurality of screws installed in an inner cavity of the barrel, wherein a co-rotating twin-screw extruder is most widely used in the co-rotating multi-screw extruder. A working mode of an equal rotation speed of two screws is used in the traditional co-rotating twin-screw extruder, but due to the left-right symmetry of left and right screws, the disturbance in a meshing zone is weak and even there is a relaxation effect, which limits a melting and plasticizing mixing effect of the co-rotating two-screw extruder. The working mode of the existing co-rotating multi-screw extruder is changed from equal speed to dual speed. Although a speed difference is introduced between the two screws and a part of elongation force field effect is introduced, the strong disturbance action and the strong elongation action cannot be generated in the meshing zone. Therefore, the existing co-rotating two-screw extruder still has limited improvement on the melting and plasticizing mixing effects of materials.

BRIEF SUMMARY OF THE INVENTION

The present disclosure is intended to solve at least one of the technical problems existing in the prior arts, and provides a co-rotating dual speed multi-screw extruder and a processing method thereof, a strong disturbance action and a strong elongation action can be generated among a plurality of screws, and a melting and plasticizing mixing effect of the co-rotating dual speed multi-screw extruder on materials is improved.

On the first aspect of the present disclosure, a co-rotating dual speed multi-screw extruder is provided, which comprises: a barrel, the barrel having an inner cavity and further having an opening; and a screw combination, the screw combination being installed in the inner cavity of the barrel, and comprising a first screw and a second screw in co-rotating dual speed rotation, and the first screw and the second screw being intermeshed to create a meshing zone; a first step structure being arranged between a root diameter and a top diameter of the first screw; a second step structure being arranged between a root diameter and a top diameter of the second screw, and the first step structure and the second step structure being meshed in the meshing zone in a staggered manner.

The co-rotating dual speed multi-screw extruder above has at least the following beneficial effects: the first screw and the second screw with the same outer diameter rotate co-rotationally at dual speed to enable the two screws to wipe with each other to realize self-cleaning in processing; a first step structure and a second step structure are arranged between root diameters and top diameters of the two screws, and the first step structure and the second step structure are meshed in the meshing zone in a staggered manner, so that a flow channel in the meshing zone is changed in a topological way, the strong elongation action and the strong disturbance action in the meshing zone are effectively introduced, and the melting and plasticizing mixing effect is improved; and meanwhile, the use of a kneading block is reduced between the two screws, thus greatly improving the self-cleaning, narrowing the distribution of materials in processing, and improving the efficiency.

According to the co-rotating dual speed multi-screw extruder described in the first aspect of the present disclosure, the first screw and the second screw are arranged vertically or horizontally in the barrel, and outer edges of the first screw and the second screw are tangent to an inner wall of the barrel. The two screws can be arranged vertically or horizontally in the barrel, and automatic matching can be performed according to a model of the barrel. Moreover, the two screws are always kept in meshing contact with each other, so that the self-cleaning function can be achieved, and the outer edges of the two screws are tangent to the inner wall of the barrel, so that the effect of promoting a stronger elongation action in the meshing zone is achieved.

According to the co-rotating dual speed multi-screw extruder described in the first aspect of the present disclosure, the first screw has a single-tip thread structure, and the second screw has a two-tip thread structure.

According to the co-rotating dual speed multi-screw extruder described in the first aspect of the present disclosure, the first screw and the second screw have the same outer diameter.

According to the co-rotating dual speed multi-screw extruder described in the first aspect of the present disclosure, a cross-sectional contour of the first screw comprises multiple curve arcs, and the multiple curve arcs on the cross-sectional contour of the first screw comprise multiple circular arcs and multiple non-circular curve arcs; a cross-sectional contour of the second screw also comprises multiple curve arcs, and the multiple curve arcs on the cross-sectional contour of the second screw also comprise multiple circular arcs and multiple non-circular curve arcs; a number of the multiple curve arcs on the cross-sectional contour of the second screw is twice that of the multiple curve arcs on the cross-sectional contour of the first screw; and the multiple curve arcs on the cross-sectional contour of the first screw are asymmetrical, and the multiple curve arcs on the cross-sectional contour of the second screw are centrosymmetric.

An unchanged cross-sectional structure is used in the two screws, so that a manufacturing process of the screw is relatively simple, and meanwhile, a symmetry between the two screws is avoided, and an axial symmetry of a single screw is also avoided. Moreover, a cross-sectional contour of the first screw is completely asymmetric, and the melting and plasticizing mixing effect of the co-rotating dual speed multi-screw extruder can be improved by utilizing an asymmetric effect of the screw.

According to the co-rotating dual speed multi-screw extruder described in the first aspect of the present disclosure, a rotating speed ratio of the first screw to the second screw is 2. The dual speed rotation of the two screws is realized, and the materials are strongly stretched.

According to the co-rotating dual speed multi-screw extruder described in the first aspect of the present disclosure, edges of the first screw and the second screw are both of smooth spiral structures. The co-rotating dual speed multi-screw extruder can realize complete self-cleaning in processing.

According to the co-rotating dual speed multi-screw extruder described in the first aspect of the present disclosure, the meshing zone comprises an upper meshing zone and a bottom meshing zone, and the first step structure and the second step structure are meshed in a staggered manner in the upper meshing zone; and the first step structure and the second step structure are meshed side-by-side in the bottom meshing zone. Staggered and side-by-side meshing relationships of the step structures of the two screws are realized in the upper and bottom meshing zones, so that the strong elongation action and the strong disturbance action in the meshing zone are effectively introduced. Moreover, the two screws rotate at a high speed, resulting in a lot of heat, which accelerates a melting process of solid materials. Meanwhile, a positive displacement conveying efficiency and a solid conveying efficiency can also be improved, the problem of unstable product quality caused by feed fluctuation of material components can be effectively solved, and an extrusion yield can be increased to a greater extent.

According to the co-rotating dual speed multi-screw extruder described in the first aspect of the present disclosure, the screw combination further comprises a third screw; and a structure of the third screw is the same as that of the first screw or the second screw, and the first screw, the second screw and the third screw are meshed in a straight line.

If the structure of the third screw is the same as that of the first screw, the first screw, the second screw and the third screw are connected in sequence; and if the structure of the third screw is the same as that of the second screw, the second screw, the first screw and the third screw are connected in sequence.

According to the co-rotating dual speed multi-screw extruder described in the first aspect of the present disclosure, the opening comprises a feed port, an exhaust port and a discharge port. The materials enter through the feed port, the exhaust port is used for exhausting waste gas, and the materials are extruded from the discharge port after melting and plasticizing mixing.

On the second aspect of the present disclosure, a processing method of a co-rotating dual speed multi-screw extruder is provided, which comprises: co-rotating a first screw and a second screw at different speeds to push materials forward in an inner cavity of a barrel; generating heat to melt the materials, by the rotation of the first screw and the second screw, and meanwhile, a first step structure arranged on the first screw and a second step structure arranged on the second screw being meshed in a meshing zone to stir and forcibly peel the materials, to make the materials become a melt; performing plasticizing mixing on the materials which become a melt under a strong elongation action and a strong disturbance action generated by periodic meshing of the first step structure and the second step structure in the meshing zone in a staggered manner; extruding the materials which become a melt out from an outlet stably; and achieving self-cleaning, by the first screw and the second screw wiping with each other.

The processing method of the co-rotating dual speed multi-screw extruder above at least has the following beneficial effects: according to the method, an acting force generated by the co-rotating dual speed rotation of the first screw and the second screw is used to push the materials forward, the materials can be melted by the heat generated by the high-speed rotation of the first screw and the second screw, the first step structure and the second step structure are meshed with each other in the meshing zone in a staggered manner, thus strengthening stirring and forced peeling effects on the materials, and meanwhile, the first step structure and the second step structure are periodically meshed in the meshing zone in a staggered manner, and the strong elongation action and the strong disturbance action are also generated, thus improving the plasticizing mixing effect on the materials which become a melt. Finally, complete self-cleaning is also realized between the first screw and the second screw.

BRIEF DESCRIPTION OF THE DRAWINGS

The present disclosure is further described hereinafter with reference to the drawings and the embodiments.

DETAILED DESCRIPTION

Figure 1:
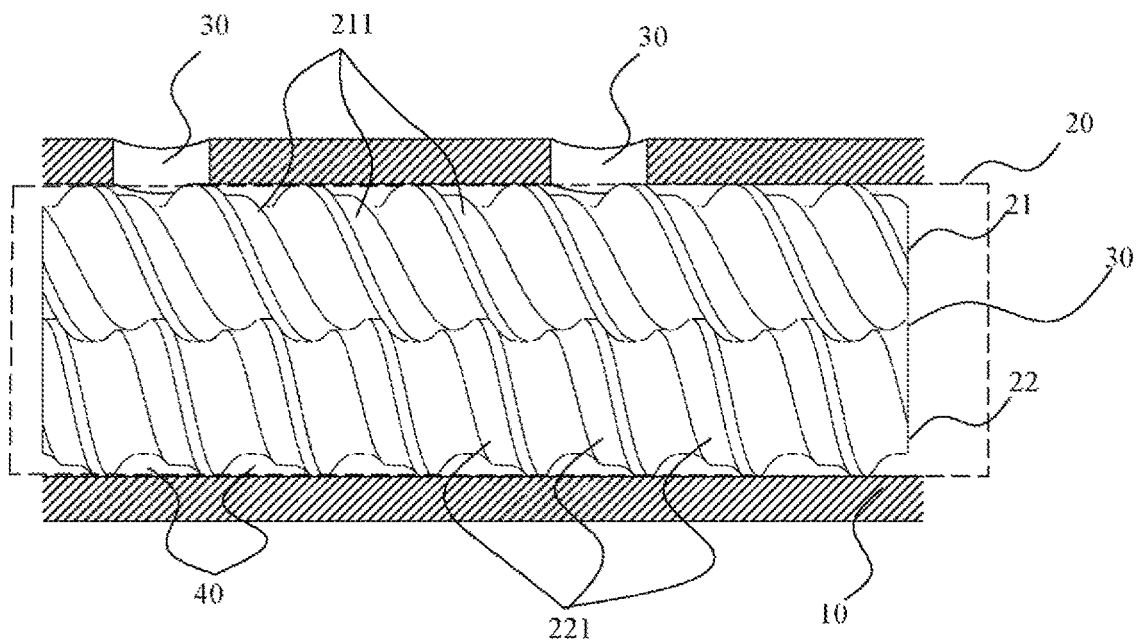
FIG. 1 is a structure diagram of a co-rotating dual speed two-screw extruder provided by a first embodiment of the present disclosure.

A co-rotating multi-screw extruder mainly comprises a barrel and a plurality of screws installed in an inner cavity of the barrel, wherein a co-rotating two-screw extruder is most widely used in the co-rotating multi-screw extruder. A working mode of a constant rotating speed of two screws is used in the traditional co-rotating two-screw extruder, but due to the left-right symmetry of left and right screws, the disturbance in a meshing zone is weak and even there is a relaxation effect, which limits a melting and plasticizing mixing effect of the co-rotating two-screw extruder. The working mode of the existing co-rotating multi-screw extruder is changed from equal speed to dual speed. Although a speed difference is introduced between the two screws and a part of elongation force field effect is introduced, a stronger disturbance action cannot be generated in the meshing zone and a stronger elongation action cannot be provided. Therefore, the existing co-rotating multi-screw extruder still has limited improvement on the melting and plasticizing mixing effect.

The present disclosure discloses a co-rotating dual speed multi-screw extruder and a processing method thereof, the co-rotating dual speed multi-screw extruder enables a first screw and a second screw with the same outer diameter to co-rotate at dual speeds in a barrel, and the two screws wipe with each other, so as to realize self-cleaning in processing; and one or multiple arcs meshed with each other are respectively introduced between root diameters and top diameters of the two screws to form a first step structure and a second step structure, thus breaking an axial symmetry of a cross-sectional contour of the screw, and moreover, the first step structure and the second step structure are periodically meshed in a meshing zone in a staggered manner, so that a flow channel in the meshing zone is changed in a topological way, a strong elongation action and a strong disturbance action are effectively introduced in the meshing zone, and a melting and plasticizing mixing effect on materials is comprehensively improved.

This part will describe the specific embodiments of the present disclosure in detail, and the preferred embodiments of the present disclosure are shown in the drawings. The purpose of the drawings is to supplement the description in the written part of the description with graphics, so that people can intuitively and vividly understand each technical feature and overall technical solution of the present disclosure, but the drawings cannot be understood as a limiting to the protection scope of the present disclosure.

In the description of the present disclosure, it shall be understood that the description regarding orientations, such as the orientation or position relationship indicated by "upper", "bottom", "front", "rear", "left", "right", refers to the orientation or position relationship based on the drawings, which is only used for facilitating the description of the present disclosure and the simplification of description instead of indicating or implying that the indicated device or element must have a specific orientation and be constructed and operated in a specific orientation. Therefore, the description regarding orientations cannot be understood as a limiting to the present disclosure.

In the description of the present disclosure, the meaning of several refers to be one or more, and the meaning of multiple refers to be more than two. The meanings of greater than, less than, more than, etc. are understood as not including this number, while the meanings of above, below, within, etc. are understood as including this number. "the first" and "the second" " " are only used for the purpose of distinguishing technical features if any, and cannot be understood as indicating or implying relative importance, implicitly indicating the number of the indicated technical features or implicitly indicating the order of the indicated technical features.

In the description of the present disclosure, unless otherwise clearly defined, words such as "arrange", "install", "connect", etc. should be understood broadly, and those skilled in the art can reasonably determine the specific meanings of the above words in the present disclosure in combination with the specific contents of the technical solution.

Referring to FIG. 1 to FIG. 5, the first embodiment of the present disclosure provides a co-rotating dual speed multi-screw extruder, and with reference to FIG. 1, the co-rotating dual speed multi-screw extruder comprises a barrel 10, and the barrel 10 has an inner cavity and further has an opening 30; the co-rotating dual speed multi-screw extruder further comprises a screw combination 20, the screw combination 20 is installed in the inner cavity of the barrel 10, and comprises a first screw 21 and a second screw 22 in co-rotating dual speed rotation, and the first screw 21 and the second screw 22 are meshed with each other to create a meshing zone; the first screw 21 and the second screw 22 have the same outer diameter; a first step structure 211 is arranged between a root diameter and a top diameter of the first screw 21; a second step structure 221 is arranged between a root diameter and a top diameter of the second screw 22, and the first step structure 211 and the second step structure 221 are meshed in the meshing zone in a staggered manner; a rotating speed ratio of the first screw 21 to the second screw 22 is 2, and edges of the first screw 21 and the second screw 22 are both of smooth spiral structures; and in the embodiment, the first screw 21 and the second screw 22 form a flow channel 40 with the inner cavity of the barrel 1, and the flow channel 40 is used for passage of materials.

The first screw 21 and the second screw 22 are arranged vertically or horizontally in the barrel 1, in FIG. 1, the first screw 21 and the second screw 22 are preferably arranged vertically for display, it can be understood that the first screw 21 and the second screw 22 can also be arranged horizontally, and the selection can be made according to an actual situation of the barrel 10. Outer edges of the first screw 21 and the second screw 22 are tangent to an inner wall of the barrel 10.

The first screw 21 and the second screw 22 co-rotate at different rotation speeds, so that the first screw and the second screw wipe with each other to realize self-cleaning, the edges of the first screw 21 and the second screw 22 are both of the smooth spiral structures, so that the use of a kneading block is reduced, and the self-cleaning is facilitated to be improved, and moreover, step structures are arranged between root diameters and top diameters of both screws, and the step structures of the two screws are meshed with each other in the meshing zone in a staggered manner, thus the flow channel 40 is changed in a topological way, and a strong elongation action and a strong disturbance action in the meshing zone are effectively introduced, thus improving the melting and plasticizing mixing effect of the co-rotating dual speed multi-screw extruder.

Figure 2:
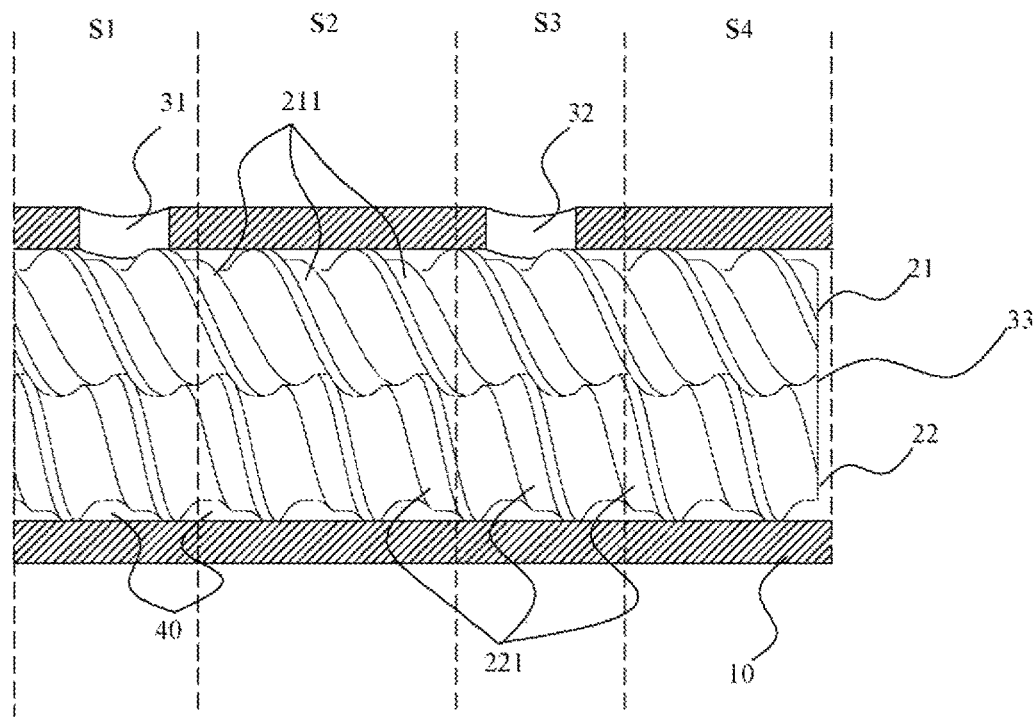
FIG. 2 is a structure diagram of different working zones of the co-rotating dual speed two-screw extruder provided by the first embodiment of the present disclosure.

Referring to FIG. 2, the barrel 10 is further provided with a conveying zone S1, a melting zone S2, an exhaust zone S3 and a mixing extrusion zone S4; in the conveying zone S1, for the melting zone S2, the exhaust zone S3 and the mixing extrusion zone S4, the processed materials move from S1 to S2 to S3 to S4, the conveying zone S1 is provided with a feed port 31 communicated with the outside, the exhaust zone S3 is provided with an exhaust port 32 communicated with the outside, and a tail end of the mixing extrusion zone S4 is provided with a discharge port 33 communicated with the outside.

Figure 3:
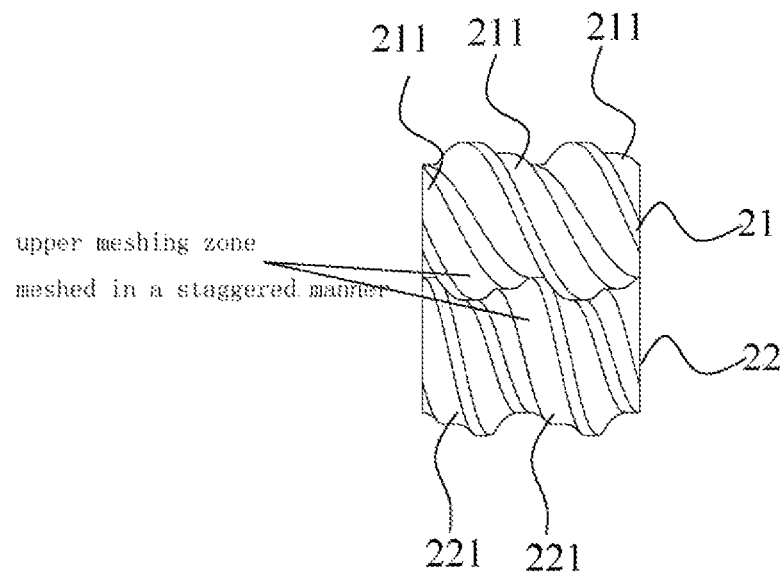
FIG. 3 is a diagram showing staggered meshing in an upper meshing zone of the co-rotating dual speed two-screw extruder provided by the first embodiment of the present disclosure.
Figure 4:
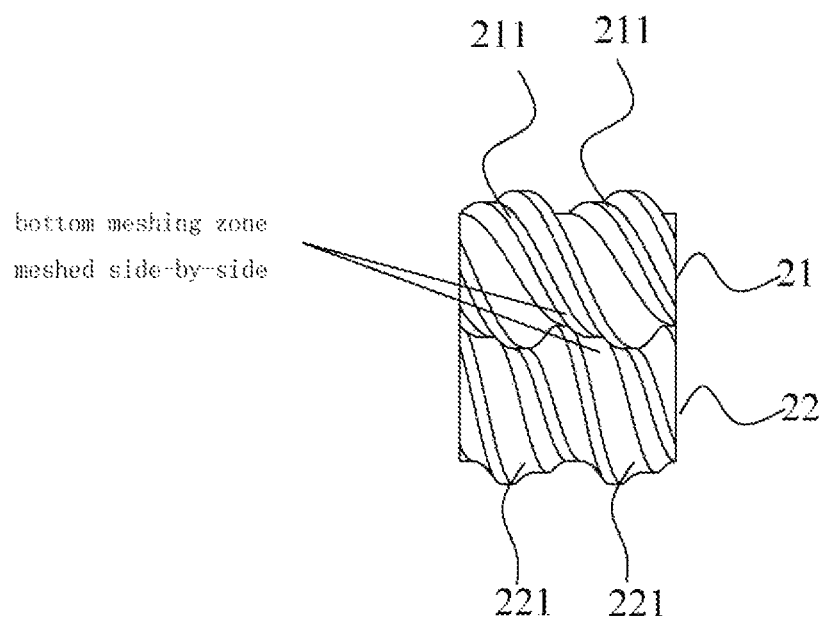
FIG. 4 is a diagram showing side-by-side meshing in a bottom meshing zone of the co-rotating dual speed two-screw extruder provided by the first embodiment of the present disclosure.

Referring to FIG. 3 and FIG. 4, the meshing zone comprises an upper meshing zone and a bottom meshing zone, and the first step structure 211 and the second step structure 221 are meshed in a staggered manner in the upper meshing zone; and the first step structure 211 and the second step structure 221 are meshed side-by-side in the bottom meshing zone. Staggered and side-by-side meshing relationships of the step structures of the two screws are realized in the upper and bottom meshing zones, and the strong elongation action and the strong disturbance action in the meshing zone can be introduced, wherein, in the embodiment, when the first screw 21 and the second screw 22 are arranged horizontally, a top view is the upper meshing zone and a bottom view is the bottom meshing zone, and it can be understood that when the first screw 21 and the second screw 22 are arranged vertically, a front view is the upper meshing zone and a rear view is the bottom meshing zone.

Figure 5:
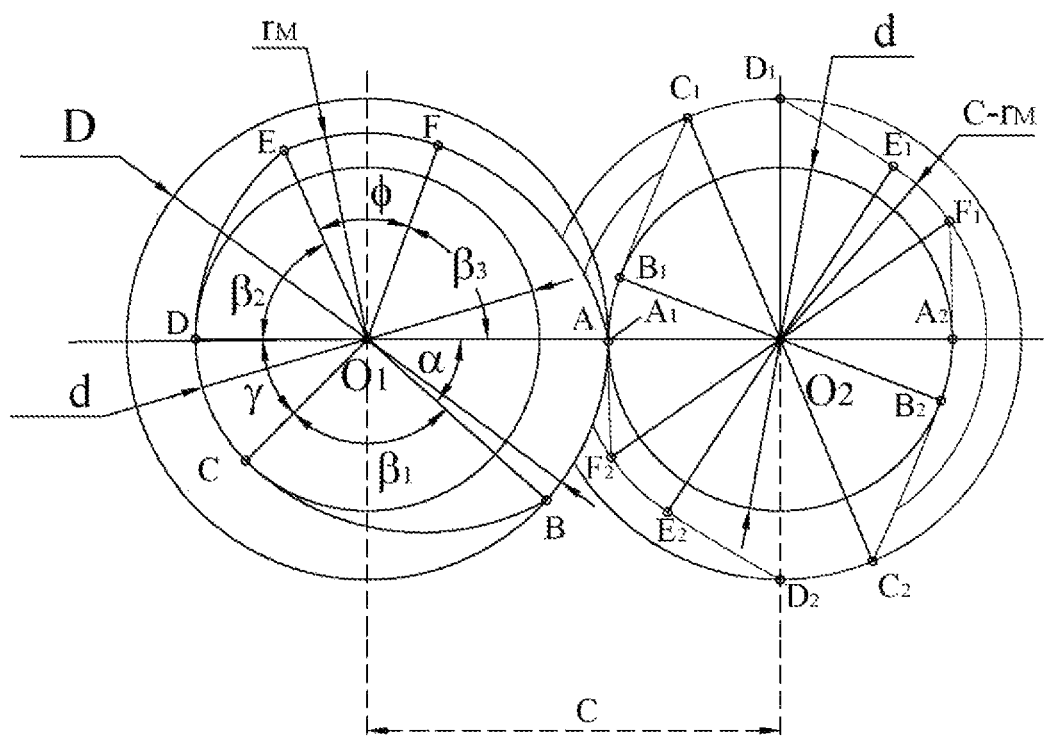
FIG. 5 is a cross-sectional contour diagram of the co-rotating dual speed two-screw extruder provided by the first embodiment of the present disclosure.

Referring to FIG. 5, a single-tip thread structure is used in the first screw 21, a circular arc with a radius $r_M$ is introduced into the cross-sectional contour of the first screw 21 to form the first stepped structure 211, $d/2 < r_M < D/2$, wherein d is inner diameters of the first screw 21 and the second screw 22, and D is maximum outer diameters of the first screw 21 and the second screw 22; a two-tip thread structure is used in the second screw 22, two circular arcs with a radius $C - r_M$ are introduced into the cross-sectional contour of the second screw 22 to form the second step structure 221, wherein C is a length of a connecting line between a rotation center $O_1$ of the first screw 21 and a rotation center $O_2$ of the second screw 22.

Referring to FIG. 5, the maximum outer diameters of the first screw 21 and the second screw 22 are D, the corresponding radius is R, the inner diameters of the first screw 21 and the second screw 22 are d, the corresponding radius is r, and then d=2C−D. The cross-sectional contour of the first screw 21 is formed by connecting six curve arcs, the six curve arcs are AB, BC, CD, DE, EF and FA in sequence, wherein BC, DE and FA are non-circular curve arcs, AB, CD and EF are circular arcs, the circular arcs and non-circular curve arcs are always connected at intervals, and a central angle $\beta_1$ corresponding to the curve arc BC is:

$$\beta_1 = 3ar\cos(C/D),$$

an auxiliary angle $\varepsilon_1$ is introduced with $O_1C$ used as a polar axis; taking a counterclockwise direction as a positive direction, the curve arc BC at a polar angle $\theta_1$ is: $\theta_1 = 2\varepsilon_1 + a\tan((D\sin\varepsilon_1)/(2C-D\cos\varepsilon_1))$, and a corresponding polar radius $\rho(\theta_1)$ is:

$$\rho(\theta_1) = \sqrt{C^2 + (D/2)^2 - CD\cos\varepsilon_1},$$ a central angle $\beta_2$ corresponding to the curve arc DE is:

$$\beta_2 = 2\arccos\left(\left(C^2 + (C-r_M)^2 - (D/2)^2\right)/(2C(C-r_M))\right) + \\ \operatorname{atan}\left(\left(\sqrt{(2C(C-r_M))^2 - \left(C^2 + (C-r_M)^2 - (D/2)^2\right)^2}\right)/ \\ \left(C^2 + (D/2)^2 - (C-r_M)^2\right)\right)$$

an auxiliary angle $\varepsilon_2$ is introduced with $O_1D$ used as a polar axis; taking a clockwise direction as a positive direction, the curve arc DE at a polar angle $\theta_2$ is:

$\theta_2 = 2\varepsilon_2 + a\tan((D\sin\varepsilon_2)/(2C-D\cos\varepsilon_2))$, a corresponding polar radius $\rho(\theta_2)$ is:

$\rho(\theta_2) = \sqrt{C^2 + (D/2)^2 - CD\cos\varepsilon_2}$, a central angle $\beta_3$ corresponding to the curve arc FA is:

$$\beta_3 = 2\arccos\left(\left(C^2 + (D/2)^2 - r_M^2\right)/DC\right) + \\ \operatorname{atan}\left(\left(\sqrt{(CD)^2 - \left(C^2 + (D/2)^2 - (r_M)^2\right)^2}\right)/\left(C^2 + (r_M)^2 - (D/2)^2\right)\right)$$

an auxiliary angle $\varepsilon_3$ is introduced with $O_1F$ used as a polar axis; taking a clockwise direction as a positive direction, the curve arc FA at a polar angle $\theta_3$ is:

$\theta_3 = 2\varepsilon_3 + a\tan((C-r_M)\sin\varepsilon_3/(C-(C-r_M)\cos\varepsilon_3))$, a corresponding polar radius $\rho(\theta_3)$ is:

$$\rho(\theta_3) = \sqrt{C^2 + (C-r_M)^2 - 2C(C-r_M)\cos\varepsilon_3}$$

wherein $r_M$ is a radius of the circular radius corresponding to the first step structure 211, and $d/2 < r_M < D/2$. The three arcs are respectively AB, CD and EF, the corresponding radii are d/2, D/2 and $r_M$, the corresponding center angles are respectively $\alpha$, $\gamma$ and $\phi$, the center angle $\phi$ meets $\alpha+\gamma+\phi=2\pi-\beta_1-\beta_2-\beta_3$, wherein the arc EF forms the first step structure 211.

A number of the multiple curve arcs on the cross-sectional contour of the second screw 22 is twice that of the multiple curve arcs on the cross-sectional contour of the first screw 21. As shown in FIG. 5, points A and $A_1$ are coincident, the cross-sectional contour of the second screw 22 is formed by connecting twelve curve arcs, which are $A_1B_1$, $B_1C_1$, $C_1D_1$, $D_1E_1$, $E_1F_1$ and $F_1A_2$, as well as $A_2B_2$, $B_2C_2$, $C_2D_2$, $D_2E_2$, $E_2F_2$ and $F_2A_1$ in sequence. The curve arcs $A_1B_1$, $B_1C_1$, $C_1D_1$, $D_1E_1$, $E_1F_1$ and $F_1A_2$ are centrosymmetric with the curve arcs $A_2B_2$, $B_2C_2$, $C_2D_2$, $D_2E_2$, $E_2F_2$ and $F_2A_1$ about the rotation center of the second screw 22, and the circular arcs and the non-circular curve arcs are always connected at intervals. $B_1C_1$, $D_1E_1$ and $F_1A_2$ are non-circular curve arcs, and the corresponding central angles are respectively $\beta_1/2$, $\beta_2/2$ and $\beta_3/2$; and similarly, the central angles corresponding to non-circular curve arcs $B_2C_2$, $D_2E_2$ and $F_2A_1$ are respectively $\beta_1/2$, $\beta_2/2$ and $\beta_3/2$. Moreover, the three circular arcs are respectively $A_1B_1$, $C_1D_1$ and $E_1F_1$, the corresponding radii are respectively d/2, D/2 and $C-r_M$, and the corresponding center angles are respectively $\alpha/2$, $\gamma/2$ and $\phi/2$. Similarly, the other three circular arcs are respectively $A_2B_2$, $C_2D_2$ and $E_2F_2$, the corresponding radii are respectively d/2, D/2 and $C-r_M$, and the corresponding center angles are respectively $\alpha/2$, $\gamma/2$ and $\phi/2$. The circular arcs $E_1F_1$ and $E_2F_2$ are the second step structures 221. Therefore, in the embodiment, the cross-sectional contours of the first screw 21 and the second screw 22 are unchanged, the multiple curve arcs of the cross-sectional contour of the first screw 21 are asymmetrical, and the multiple curve arcs of the cross-sectional contour of the second screw 22 are centrosymmetric about the rotation center. An unchanged cross-sectional contour is used in the two screws, so that a manufacturing process of the screw is relatively simple, and meanwhile, a symmetry between the two screws is avoided, and an axial symmetry of a single screw is also avoided. Moreover, a cross-sectional contour of the first screw is completely asymmetric, and the melting and plasticizing mixing effect of the co-rotating dual speed multi-screw extruder can be improved by utilizing an asymmetric effect of the screw. It can be understood that, in the embodiment, the cross-sectional contour of the first screw 21 comprises three circular arcs and three non-circular curve arcs, and the cross-sectional contour of the second screw 22 comprises six circular arcs and six non-circular curve arcs, which is only the preferred solution; and in practical application, the cross-sectional contour of the first screw 21 can comprise N circular arcs and N non-circular curve arcs, and the cross-sectional contour of the second screw 22 can comprise 2N circular arcs and 2N non-circular curve arcs, wherein N can be any number on the premise of ensuring the normal use of the first screw 21 and the second screw 22.

Referring to FIG. 2, a processing method for materials in a co-rotating dual speed two-screw extruder in the embodiment comprises the following steps.

After the materials enter the flow channel of the conveying zone S1 from the feed port 31, the first screw 21 and the second screw 22 respectively rotate co-rotationally at different speeds about the screw axes to generate a conveying force; and meanwhile, the first step structure 211 and the second step structure 221 are meshed in a staggered manner in the upper meshing zone and side-by-side in the bottom meshing zone, thus increasing an axial positive displacement conveying force, and the materials move to the melting zone S2 under the action of the conveying force and the combined action of a friction force between the two screws.

When the materials flow to the flow channel of the melting zone S2, due to the heat generated by the high-speed rotation of the two screws and the staggered meshing of the step structures, the materials are forcibly melted at a thrust surface position of the first screw 21 and a dragging surface position of the second screw 22, and with staggered and parallel periodic changes of the first step structure 211 and the second step structure 221 in the upper and bottom meshing zones, and the materials are stirred and forcibly peeled, thus promoting an interface updating effect, strengthening a heat transfer process, accelerating a melting process of the solid materials, and enabling the materials to become a melt.

After the materials which become a melt enter the flow channel of the exhaust zone S3 from the flow channel of the melting zone S2, pushing and scraping actions formed by the meshing of the first step structure 211 and the second step structure 221 with each other promote the interface updating and expand an exhaust area, and a negative pressure action is generated by the materials collected here, thus accelerating the exhaust gas to be discharged from the exhaust port, while the molten materials continue to be move towards the flow channel direction of the mixing extrusion zone S4.

After the materials which become a melt enter the flow channel of the mixing extrusion zone S4, the first screw 21 and the second screw 22 are meshed and operated co-rotationally at different speeds, i.e., the speed ratio of 2, the first step structure 211 and the second step structure 221 are also meshed with each other in a staggered manner, the molten materials are subjected to a periodic action in a process of moving towards the discharge port 33, and the strong elongation action and the strong disturbance action in the meshing zone, and are also subjected to the action of different topological flow channel mechanisms, thus improving the plasticizing mixing effect and enabling the materials which become a melt to be stably extruded from the discharge port, and meanwhile, the first screw 21 and the second screw 22 wipe with each other, so as to realize complete self-cleaning.

Figure 6:
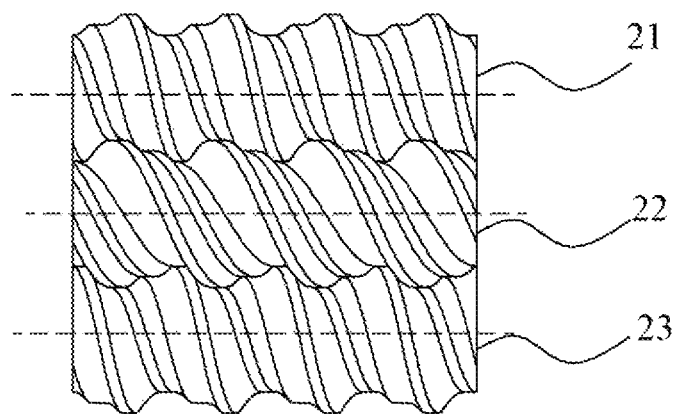
FIG. 6 is a structure diagram of a co-rotating dual speed triple-screw extruder provided in the second embodiment of the present disclosure.

Referring to FIG. 6, in the second embodiment of the present disclosure, a co-rotating dual speed triple-screw extruder is provided, different from the first embodiment, the screw combination 20 further comprises a third screw 23, the third screw 23 has the same structure as the first screw 21 in the first embodiment, and the first screw 21, the second screw 22 and the third screw 23 are meshed in a "straight line" in sequence.

Figure 7:
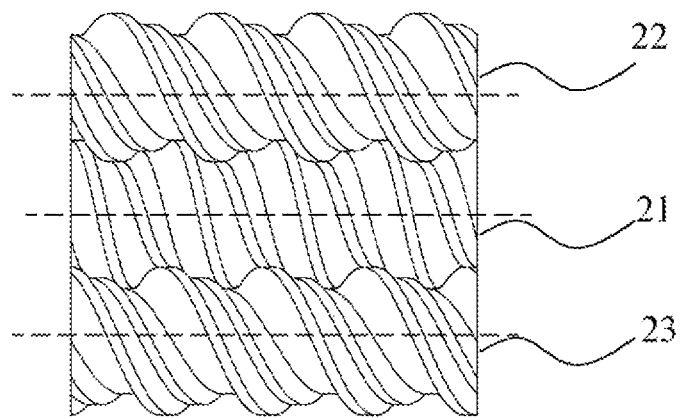
FIG. 7 is a structure diagram of the co-rotating dual speed triple-screw extruder provided in the third embodiment of the present disclosure.

Referring to FIG. 7, in the third embodiment of the present disclosure, a co-rotating dual speed triple-screw extruder is provided, different from the first embodiment, the screw combination 20 further comprises a third screw 23, the third screw 23 has the same structure as the second screw 22 in the first embodiment, and the second screw 22, the first screw 21 and the third screw 23 are meshed in a "straight line" in sequence.

The embodiments of the disclosure are described in detail above with reference to the drawings, but the disclosure is not limited to the embodiments above, and various changes may be made within the scope of knowledge possessed by those of ordinary skills in the technical field without departing from the purpose of the disclosure.

What is claimed is:

1. A co-rotating dual speed multi-screw extruder, comprising:
   a barrel, having an inner cavity and an opening; and
   a screw combination, being installed in the inner cavity of the barrel, and comprising a first screw and a second screw, which co-rotating at different rotation speed, and the first screw and the second screw being intermeshed to create a meshing zone;
   wherein a first step structure being arranged between a root diameter and a top diameter of the first screw, and a second step structure being arranged between a root diameter and a top diameter of the second screw, the first step structure and the second step structure being meshed in the meshing zone in a staggered manner;
   wherein a cross-sectional contour of the first screw comprises multiple curve arcs, and the multiple curve arcs on the cross-sectional contour of the first screw comprise multiple circular arcs and multiple non-circular curve arcs;
   wherein a cross-sectional contour of the second screw further comprises multiple curve arcs, and the multiple curve arcs on the cross-sectional contour of the second screw also comprise multiple circular arcs and multiple non-circular curve arcs;
   wherein a number of the multiple curve arcs on the cross-sectional contour of the second screw is twice that of the multiple curve arcs on the cross-sectional contour of the first screw;
   wherein the multiple curve arcs on the cross-sectional contour of the first screw are asymmetrical, and the multiple curve arcs on the cross-sectional contour of the second screw are centrosymmetric; and
   wherein a rotating speed ratio of the first screw to the second screw is 2.

2. The co-rotating dual speed multi-screw extruder according to claim 1, wherein the first screw and the second screw are arranged vertically or horizontally in the barrel, and outer edges of the first screw and the second screw are tangent to an inner wall of the barrel.

3. The co-rotating dual speed multi-screw extruder according to claim 1, wherein the first screw has a single-tip thread structure, and the second screw has a two-tip thread structure.

4. The co-rotating dual speed multi-screw extruder according to claim 1, wherein the first screw and the second screw have a same outer diameter.

5. The co-rotating dual speed multi-screw extruder according to claim 1, wherein the meshing zone comprises an upper meshing zone and a bottom meshing zone, wherein in the upper meshing zone the first step structure and the second step structure are meshed in the staggered manner, and wherein in the bottom meshing zone the first step structure and the second step structure are meshed side-by-side.

6. The co-rotating dual speed multi-screw extruder according to claim 1, wherein the screw combination further comprises a third screw; and a structure of the third screw is a same as that of the first screw or the second screw, and the first screw, the second screw and the third screw are meshed in a straight line.

7. The co-rotating dual speed multi-screw extruder according to claim 1, wherein the opening comprises a feed port, an exhaust port and a discharge port.

8. A processing method of a co-rotating dual speed multi-screw extruder, comprising:
   rotating a first screw and a second screw co-rotationally at dual speeds to push materials forward in an inner cavity of a barrel;
   generating heat to melt the materials, by the rotating of the first screw and the second screw, and meanwhile, a first step structure arranged on the first screw and a second step structure arranged on the second screw being meshed in a meshing zone to stir and forcibly peel the materials, to make the materials become a melt;
   wherein a cross-sectional contour of the first screw comprises multiple curve arcs, and the multiple curve arcs on the cross-sectional contour of the first screw comprise multiple circular arcs and multiple non-circular curve arcs;

wherein a cross-sectional contour of the second screw also comprises multiple curve arcs, and the multiple curve arcs on the cross-sectional contour of the second screw also comprise multiple circular arcs and multiple non-circular curve arcs;

wherein a number of the multiple curve arcs on the cross-sectional contour of the second screw is twice that of the multiple curve arcs on the cross-sectional contour of the first screw;

wherein the multiple curve arcs on the cross-sectional contour of the first screw are asymmetrical, and the multiple curve arcs on the cross-sectional contour of the second screw are centrosymmetric; and wherein a rotating speed ratio of the first screw to the second screw is 2;

performing plasticizing mixing on the materials which become a melt under a strong elongation action and a strong disturbance action generated by periodic meshing of the first step structure and the second step structure in the meshing zone in a staggered manner;

extruding the materials which become a melt out from an outlet stably; and realizing self-cleaning, by the first screw and the second screw wiping with each other.

\* \* \* \* \*